F. O. GRAY.
FLUID GOVERNOR.
APPLICATION FILED SEPT. 19, 1908.
1,010,747.
Patented Dec. 5, 1911.
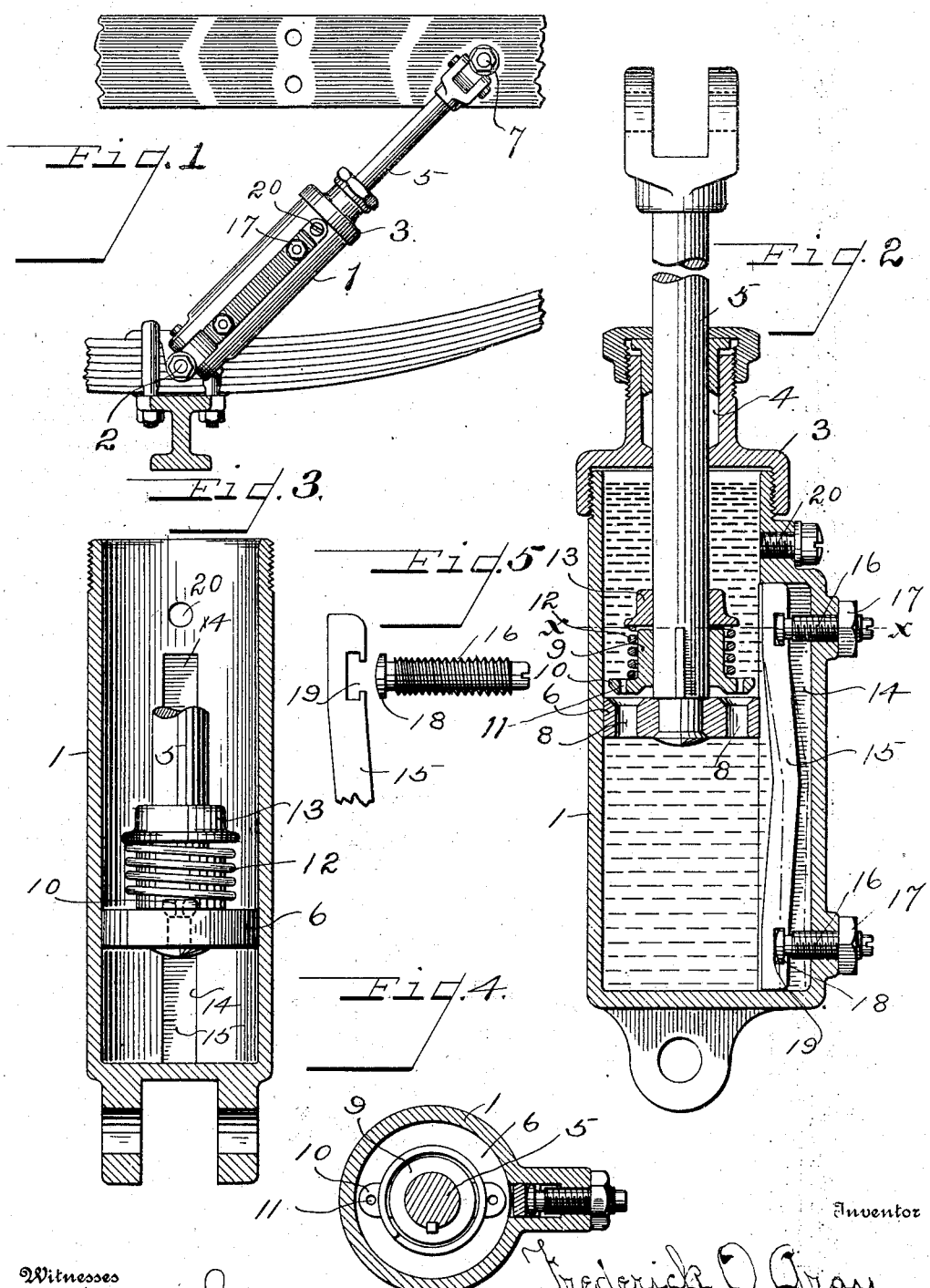
Witnesses
H. A. Penfield
Alonzo Allison
Inventor
Frederick O. Gray
By F. L. Walker
Attorney

UNITED STATES PATENT OFFICE.

FREDERICK O. GRAY, OF JAMESTOWN, OHIO.

FLUID-GOVERNOR.

1,010,747.  Specification of Letters Patent.  Patented Dec. 5, 1911.

Application filed September 19, 1908. Serial No. 453,873.

*To all whom it may concern:*

Be it known that I, FREDERICK O. GRAY, a citizen of the United States, residing at Jamestown, in the county of Greene and State of Ohio, have invented certain new and useful Improvements in Fluid-Governors, of which the following is a specification.

My invention relates to governors and particularly to a reciprocating governor adapted to be used as shock absorber for checking excessive vibration or oscillation of a movable body.

The device is especially adapted to use on motor or other vehicles, to control the movement of the vehicle body when traveling over rough or uneven roads, to obviate jolting and shock to the occupants, and to reduce to minimum the wear and strain on vehicle parts.

The object of the invention is to simplify the structure as well as the means and mode of operation of such devices whereby they will not only be cheapened in construction, but will be more efficient in operation, easily adjusted, more or less sensitive, and unlikely to get out of repair.

As is well known, it is not the downward movement or initial movement of the vehicle body which disturbs the occupants and strains the vehicle parts, but it is the rebound or return movement of the vehicle body which it is most desirable to control.

One of the primary objects of the invention is to provide a device in which the initial or downward movement of the vehicle will be free, while the return or rebound movement will be retarded, the return being more or less gradual according to the adjustment of the device.

Further primary objects are to provide suitable and efficient means for adjusting the device whereby the resistance to the movement of the vehicle body will be variable throughout the stroke.

With the above primary and other incidental objects in view as will more fully appear from the specification, the invention consists of the means, parts, construction, and mode of operation, or their equivalents, as hereinafter described and set forth in the claims.

In the drawings, Figure 1 is a side elevation of the assembled governor or shock absorber located between the vehicle body and the axle thereof. Fig. 2 is a vertical sectional view of the assembled governor. Fig. 3 is a vertical sectional view at right angle to that of Fig. 2, some of the parts being removed. Fig. 4 is a transverse sectional view on line X X of Fig. 2. Fig. 5 is a detail view of the adjustment bar connection.

Like parts are indicated by similar characters of reference throughout the several views.

In constructing the device, there is employed a cylinder or dash pot 1 which is connected by universal joint 2 with the axle or other portion of the running gear of the vehicle. The dash pot 1 is provided with a cap 3 having therein a stuffing box 4 through which extends the piston rod 5 of the piston 6, adapted to reciprocate within the dash pot 1. The piston rod 5 is connected by universal joint 7 with the vehicle body. The piston head 6 is provided with one or more ports 8 which form a means of communication between the opposite sides of the piston head. In the drawings, two such ports have been shown. Mounted on the piston rod 5 adjacent to the piston head 6, is a reciprocating valve member 9 having valve extensions 10 registering with the ports 8 of the piston head. The valve extensions 10 are provided with perforations or ports 11 of considerable less dimension than the ports 8. By this construction, the valve member 9, when in register with the ports 8, will serve to reduce the communicating opening through the piston head, but will not wholly close said means of communication between the opposite sides of the piston. The valve member 9 is normally pressed toward the piston head 6 by a helical spring 12 bearing at one end on said valve member 9, and at the other end against a collar 13 secured on the piston rod 5.

In one side of the cylinder or dash pot 1, is a recess 14 extending throughout the limit of travel of the piston. Within the recess 14 is a movable adjusting bar 15. The bar 15 is preferably unalined as shown in Fig. 2. The opposite ends of the bar 15 are independently adjustable to and from the axis of the cylinder 1 by adjusting screws 16 extending through the walls of the recess 14 and provided with lock nuts 17. The adjusting screws 16 are each provided with a head 18 which engages an under cut slot or notch 19 in the bar 15. The recess 14 forms a by-pass connecting the opposite sides of the piston head 6, of which the bar 15 constitutes a false bottom. The adjustment of the bar 15 to and from the dash pot 1 by means of the adjusting screws 16 reduces or increases the cross-area of the by-pass. The curvature of the bar 15 gives a variation in the capacity of the by-pass according to the position of the piston within the cylinder or dash pot. When adjusted as shown in Fig. 2 the cross-area of the by-pass will gradually increase until the piston reaches the middle of its stroke, from which point the by-pass will gradually decrease to the limit of the piston stroke. By the independent adjustment of the screws 16 the bar 15 may be adjusted within the recess 14 as indicated by dot and dash lines in Fig. 2, in which it is shown as extending parallel with the path of travel with the piston throughout the lower half, while the upper half of the bar is inclined to the path of travel. Thus the piston will move freely throughout the lower half of its stroke, while during the upper half of the stroke, will gradually be retarded. The dash pot is filled with oil or other fluid through a filling orifice closed by the screw 20. The filling orifice is entirely independent of the by-pass and adjusting features. The oil within the dash pot may therefore be replenished without interfering with the adjustment of the device. By the use of the governor or shock absorber constructed as described, the cushioning effect of the vehicle springs will be in no way impaired except in case of extremely violent shocks, when a slight resistance may result, which in such cases is desirable. When the wheels of a vehicle encounter an obstruction or depression the initial movement of the parts, due to the cushioning of the springs, will be toward each other, thus causing an upward movement of the cylinder or dash pot, or downward movement of the piston, or perhaps both.

The object of the present invention is to check or neutralize the rebound or return movement of the parts without affecting the utility of the springs. Upon initial movement of the parts, the pressure on the under side of the piston will automatically raise or unseat the valve member 9 from the ports 8 and allow the oil to pass freely through said ports 8 to the upper side of the piston head. At the limit of the movement of the parts, the valve member 9, through the action of the spring 12, will be reseated on the piston head, closing the ports 8 and leaving only the small ports 11 open, through which the oil will return slowly to the under side of the piston head during the upward movement of the piston. During this double movement the initial or downward movement of the parts is only resisted to the extent of causing the springs to work gently and smoothly in case of sudden shocks, while the rebound is automatically controlled by the gradual return of the parts to normal position. In addition to the passage for the oil through the piston head, the by-pass formed by the recess 14 provides an additional means of controlling the movement of the oil. This feature is especially desirable in adjusting devices for vehicle bodies of different weights or for different spring tension. By the different adjustments of the bar 15 different results may be obtained for example, as shown in Fig. 2, the movement of the piston will be slightly retarded toward either end of its stroke; by adjusting the lower end of the bar outward as is shown in dot and dash lines, the movement of the piston will be retarded only at the upper limits of its stroke, while by a reverse adjustment of the bar, that is, by moving the upper end outward to a position substantially parallel with the movement of the piston, the piston will be retarded only as it approaches the lower limit of its stroke. In any of its positions, the cross-area of the by-pass may be varied, and thereby the speed of the piston controlled by adjusting the screws 16 in unison to move the bar to or from the path of travel of the piston.

While the invention has been shown and described as particularly applied to vehicles it is to be understood that it is not limited to such use, but may be employed in other combinations for controlling the movement of relatively movable bodies, as for instance, in controlling the movement of doors, or certain machine parts in which it is desired to govern the movement or cushion the shock.

From the above description it will be apparent that there is thus produced a governor of the character described possessing the particular features of advantage before enumerated as desirable, and which is susceptible of modification in its form, proportion, detail construction, and arrangement of parts without departing from the principle involved or sacrificing any of its advantages.

Having thus described my invention, I claim:

1. In a shock absorber, the combination of a piston connected with one of the relatively movable members, a cylinder therefor connected with the other relatively movable member, a longitudinal relief channel in said cylinder, and an adjustable wall thereof adapted to vary the area of said channel.

2. In a shock absorber, the combination of a piston connected with one of the relatively movable members, a cylinder therefor connected with the other relatively movable member, a longitudinal relief channel in said cylinder, an adjustable wall thereof adapted to vary the area of said channel, and means to adjust said wall.

3. In a device as described, a fluid containing cylinder a piston therein, a longitudinal groove in the side of the cylinder forming a by-pass communicating with opposite sides of said piston, a false wall in said by-pass, means for varying the effective cross area of said by-pass by the adjustment of said false wall, substantially as specified.

4. In a device as described, a fluid containing cylinder, a piston therein, a longitudinal recess in the side of said cylinder, a movable bar in said recess, and means to adjust said bar to and from said cylinder, substantially as specified.

5. In a device as described, a fluid containing cylinder, a piston therein, a by-pass connecting the portions of the cylinder on opposite sides of the piston head, an adjustable wall member forming a portion of the wall of said by-pass and means to adjust said wall member to vary the cross area of the by-pass substantially as specified.

6. In a device as described, a fluid containing cylinder, a piston in said cylinder, a longitudinal recess in the side of said cylinder, a movable bar located in said recess, means for independently adjusting the opposite ends of said bar whereby the relative position of said bar may be varied, substantially as specified.

7. In a device as described, a fluid containing cylinder, a piston therein, a longitudinal recess in the side of said cylinder forming a by-pass connecting opposite sides of the piston, an unalined bar located in said recess, and means to adjust said bar, substantially as specified.

8. In a device as described, a fluid containing cylinder, a piston therein, a longitudinal recess in the side of said cylinder forming a by-pass connecting the opposite sides of the piston head, an unalined bar for said by-pass whereby the cross area of the by-pass will be greatest at a point substantially mid-way of the piston stroke, the area of the by-pass gradually diminishing in either direction from said point, and means for adjusting the unalined wall within the by-pass thereby varying the capacity of the by-pass, substantially as specified.

9. In a device as described, a fluid containing cylinder, a longitudinal recess therein, an unalined bar in said recess, and forming one side of a by-pass connecting the opposite sides of said piston, means for independently adjusting the opposite ends of said bar, whereby said bar may extend parallel with the path of travel of the piston throughout a portion of its length and angularly therewith throughout the remainder of its length whereby the by-pass will be uniform throughout a portion of its length and gradually diminishing throughout the remainder of its length substantially as specified.

10. In a device as described, a fluid containing cylinder, a piston in said cylinder, a longitudinal recess in the side of said cylinder, forming a by-pass connecting opposite sides of said piston head, a movable bar in said recess, adjustment screws extending within said recess and engaging said bar, whereby said bar may be adjusted to vary the capacity of said by-pass, substantially as specified.

In testimony whereof, I have hereunto set my hand this 15" day of September A. D. 1908.

FREDERICK O. GRAY.

Witnesses:
HARRY F. NOLAN,
F. L. WALKER.